Feb. 21, 1939.  C. J. BAKER  2,148,184
COTTON CONDITIONING APPARATUS
Filed Jan. 12, 1937  2 Sheets—Sheet 2
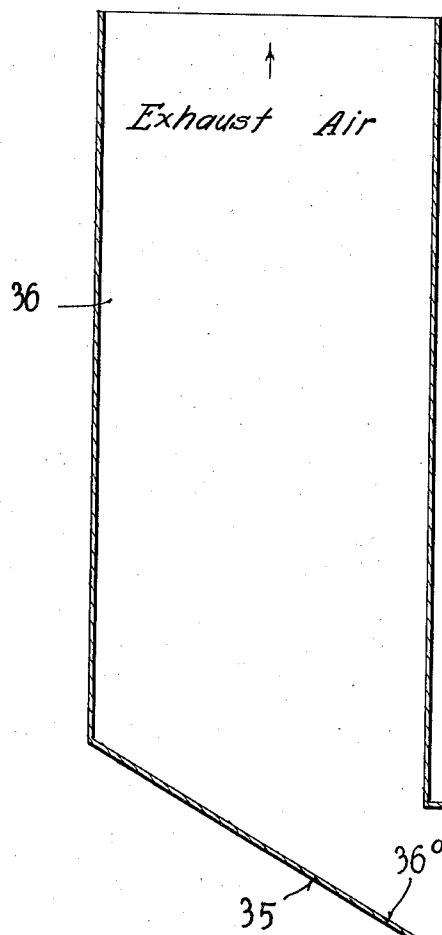
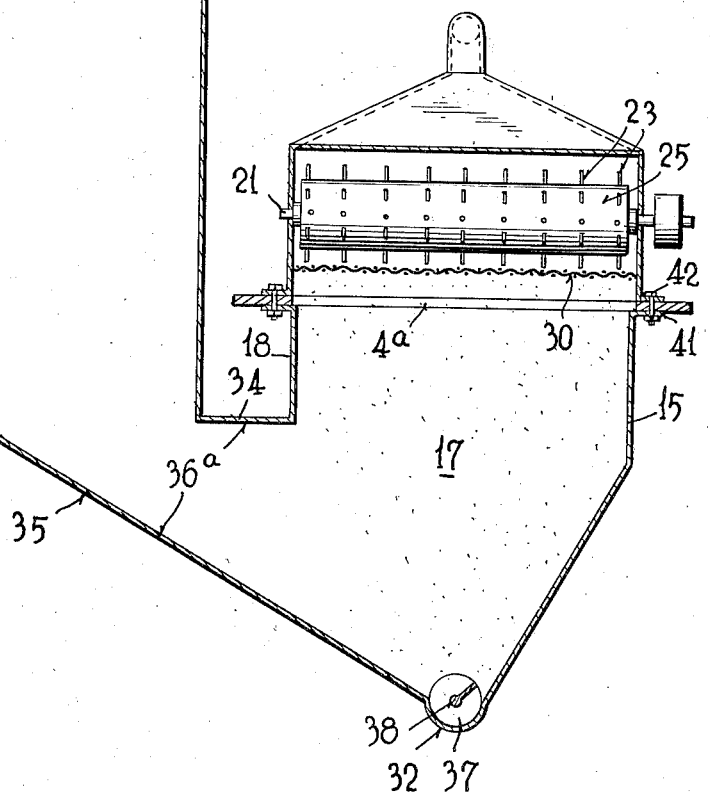
Fig. 2.
Inventor
Clyde J. Baker,
By Herbert M. Birch
Attorney Patented Feb. 21, 1939

2,148,184

UNITED STATES PATENT OFFICE 2,148,184

COTTON CONDITIONING APPARATUS

Clyde J. Baker, Hobart, Okla.

Application January 12, 1937, Serial No. 120,270

2 Claims. (Cl. 19—76)

This invention relates to methods and apparatus for treating cotton and more particularly to cleaning and conditioning picked or snapped cotton prior to delivery to a gin.

The green cotton as delivered to the gin is in various undesirable conditions. For example, cotton picked fully matured or snapped in the boll and picked from the ground is full of fine dirt and other foreign matter that seriously impairs its commercial value unless removed. It has long been the problem of the ginner to find an economical and yet efficient means for eliminating the dust and foreign matter from the picked cotton before it is delivered to a gin for separation of the seed from the lint. The efficiency of the gin and quality of the finished cotton is very materially improved if a clean dustless cotton is conveyed into the gin at all times.

Also, cotton in general contains more moisture than it should have to clean well, and green cotton, as taken from the field, will frequently run as high as 12% or 13% R. This excessive moisture which I have above expressed in terms of "regain", viz., the percentage of moisture in fibre, based on its dry weight, presents yet another problem to the ginner.

It is the primary object of this invention to overcome the foregoing problems.

A further object of my invention is to simplify and eliminate several hitherto necessary parts of the cotton treating and cleaning mechanism, but yet provide for more efficient and economical cleaning and conditioning of the cotton whether it be green cotton from the field or picked cotton that has been stored all season in a warehouse.

All prior machines, systems and methods for cleaning and conditioning cotton for a gin have included the following apparatus; a pneumatic conveyor to and from the bin or farm wagon, a separator or dropper for separating the cotton from the air and dropping it into the cleaner as it comes from the conveyor tube and a series of stationary wire screens arranged in tiers over which the cotton is forced by gravity or mechanical means such as beaters and spiked cleaner cylinders. Due to the fact that some of the cotton is moist and contains more dirt and foreign matter, it is necessary with the usual apparatus to have two or more successive cleaner units to get the cotton reasonably clean. Even with this successive cleaning the dust is not properly removed and I have solved this problem by blowing the cotton into the cleaner, under air pressure, instead of dropping it in from a separator as is now done.

By blowing the cotton into the cleaner under air pressure, I eliminate the dropper or separator and a substantial part of the usual cleaner units and provide below the cleaner screen a spacious dust collector specially adapted not to retard the air forced downwardly through the cotton and the screen.

In gins now common the cotton simply drops or falls into the cleaner without air pressure or air circulating with it, so that while the cylinders beat out the dirt, gravity alone is depended upon to settle it out through the screen. I improve upon this gravity settling method by blowing air into the cleaner under pressure whereby the fine dirt beaten out of the cotton by the cylinders will be forced out through the screen.

The air under pressure, also, fluffs the cotton and dries it while it is being cleaned, thereby enabling the ginner to turn out a high quality product for spinning.

Further objects and advantages of my invention will be more apparent from the following specification and claims, together with the accompanying drawings.

Figure 2 is an end view in cross section of Figure 1 along the line 2—2.

Figure 1:
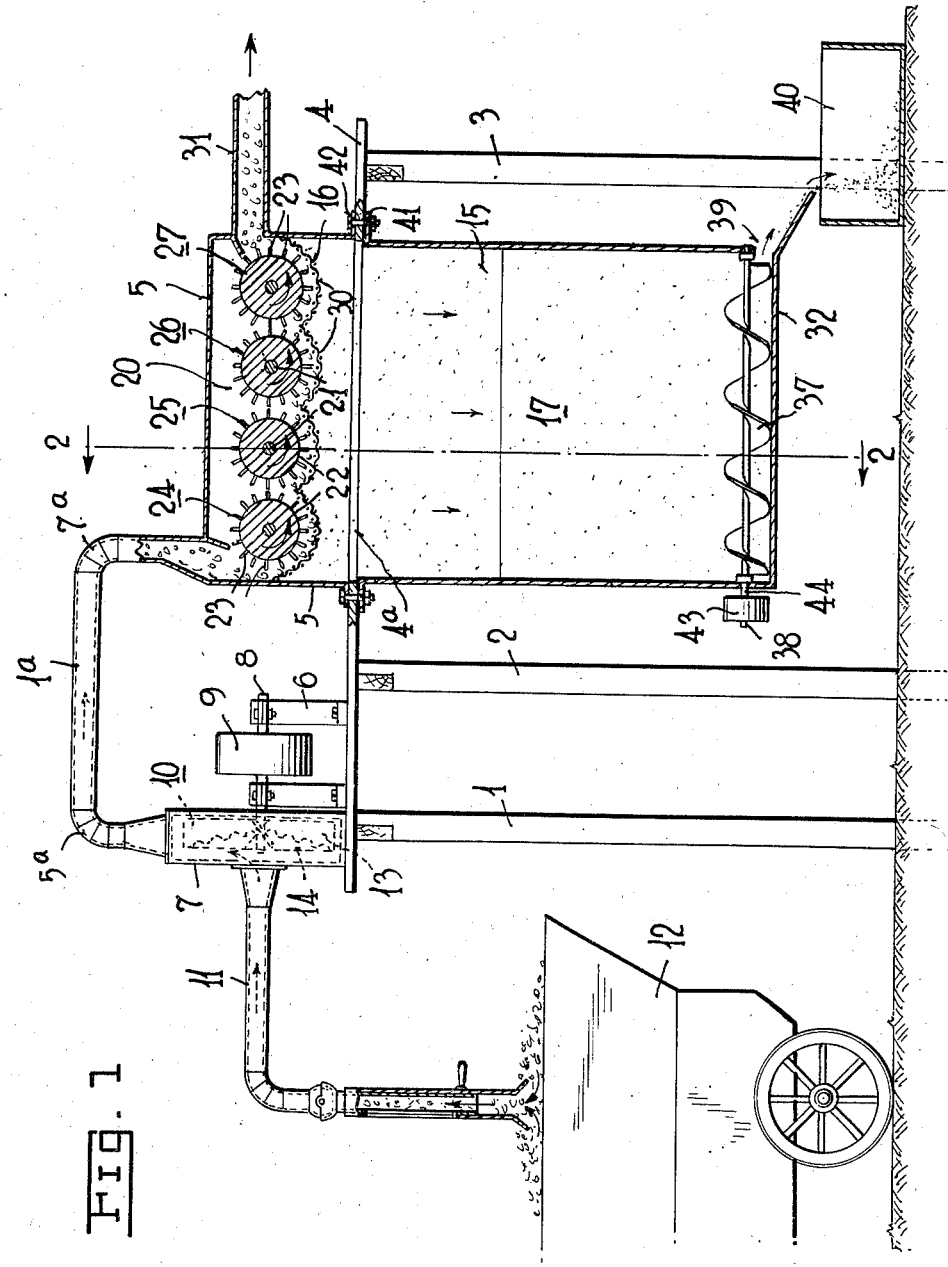
Figure 1 is a side elevational view partly in cross section illustrating the arrangement and positioning of the various devices embodied in my improved cotton cleaning system.

Referring more specifically to my invention and the accompanying drawings, legs 1, 2 and 3 serve as supports for a base 4 with an elongated opening 4a, upon which is secured a cotton cleaner unit 5 of the usual conventional type, a pulley supporting stand 6 and a fan housing 7.

Mounted in the pulley supporting stand 6 is a shaft 8, journaled therein in any suitable manner to permit rotation of the shaft 8 to which the pulley 9 is splined or otherwise fixedly secured. The shaft 8 extends from the pulley stand 6 into the fan housing 7 and has splined thereto a fan 10, adapted to have power transmitted to it from a suitable source of power in connection with the drive pulley 9 for high speed rotation.

The fan 10, of the Remberdt type as hereinafter described, is positioned with particular care so that it faces a funnel-shaped portion of a conveyor tube 11 leading from a farm wagon 12 or any other suitable storage container, and has its blades 13 so pitched that a suction is created in tube 11 as said fan rotates. This sucking action draws the cotton to be cleaned up into the conveyor tube 11 and into the fan housing 7 against a perforated metal disc 14 inclosing and protecting the fan blades 13. As the cotton continues to be drawn upward into the fan housing 7, it is forced toward the top of said fan housing to a point above the leading edges of the fan blades 13. Immediately upon reaching this point above the fan blades the cotton is forcibly blown under air pressure into a funnel-shaped portion of an inverted U-shaped conveyor tube 1a leading from the top of the fan housing 7 directly above the leading edges of the fan blades 13 to a cotton cleaner 5.

The conveyor 1a extends upwardly from fan housing 7 and from cleaner 5 into two back pressure preventer bends 5a and 7a. The bends 5a and 7a assist materially in building up air pressure in tube 1a, so that the air is fed into the cleaner 5 at high velocity. This, likewise, obviously feeds a greater quantity of cotton per minute into the cleaner.

The cleaner 5 includes a chamber 20 transversed by one or more shafts 21, four being used here for the purpose of illustration, each having frames 22 secured thereon from which radially protrude fingers or teeth 23 forming beaters 24, 25, 26 and 27. Extending horizontally from one end of the chamber 20 to the opposite end beneath the beaters 24, 25, 26 and 27 is a screen 16. Screen 16 is curved to form troughs 30 which follow the contour of the cylindrical beaters 24, 25, 26 and 27, the purpose of the screen being to allow the dirt beaten from the cotton to be forced through it into the large non air-retarding dust collector 17 to be hereinafter fully described.

As the cotton is fed under pressure into the cleaner 5, it is taken up by the beater rolls 24, 25, 26 and 27 and is forcibly beaten against the wire screen 16 located at the lower part of the cleaner chamber 20. The beater rolls which rotate in a counter-clockwise direction separate the cotton from the conveying air and direct the cotton down against the screen 16 below the said beater rolls, which mechanically convey it through the cleaner chamber 20 to outlet 31 from where it goes to the gin, not shown. The air from which the cotton is thus separated escapes downwardly through the screen 16 into the dust collector 17, none of the air espacing through the cotton outlet 31. The beaters break the bolls and beat dirt and foreign matter from the cotton in this, the usual and customary manner; and at this point the merit of my invention is apparent for immediately upon severing any particle of dirt or foreign matter from the cotton, the air from the fan 10 and the conveyor tube 1a forces the dirt downwardly through the screen 16 into a large spacious dust collector 17. Prior to my invention the dirt had no specific means to carry it down and out through the screen, other than the settling of the dirt by gravity, with the result that the cotton was never thoroughly cleaned even though put through a series of cleaning operations.

The dust collector 17 is constructed to be non-air retarding and may be of any suitable structure. It is secured, by means of flanges 41 and bolts 42, to the underside of platform or base 4, which outlines the opening 4a, below the cleaner 5 and under the screen 16. As illustrated in the drawings the dust collector 17 includes a housing open at the top under the cleaner 5, closed on one side 15 and tapering downwardly into a trough or rounded nose portion 32. Leading from the opposite side 18 is an open neck 36a formed by wall 34 at substantially right angles to side 18 and an upwardly extending wall 35, which continues from the trough 32 at the bottom of the dust collector 17, to an elongated vertically extending air exhaust duct 36. The result is a communicating neck-like portion 36a which connects the dust collector with the air exhaust duct.

Within the rounded trough 32 is a screw conveyor 37 mounted on a drive shaft 38 journaled in the end walls of dust collector 17 and one end of said shaft 38 protruding and projecting out from one of said end walls at 44, on which is mounted a pulley 43 to drive the said shaft.

Dirt and trash are thus conveyed from the bottom of the collector 17 out an opening 39 at the end of trough 32 into a suitable receiver 40. The air and lighter dust exhaust out into the atmosphere through the exhaust duct 36 and the heavier trash and dirt are conveyed out through said opening 39 by the conveyor 37.

The operation of my cotton cleaning and conditioning apparatus and system is as follows:

The cotton is drawn from a point remote from the cleaner, as a wagon or other source of supply, through a pneumatic conveyor tube by means of a suction fan. When the cotton reaches the fan housing, it is forced upward therein to a point above the fan in the top of the fan housing, above the leading edges of the fan blades, whereby the cotton is blown by force of air pressure derived from the fan through a pneumatic conveyor tube to the cleaner chamber.

The positioning of the suction fan and blower in the system at the point described forces the cotton into the cleaner under high pressure. Thus the cleaning process of the beaters in the cleaner chamber is materially aided due to the blast of air entering the cleaner, which forces the dirt and other foreign material through the wire screen into the dust collector while the beaters, which rotate in an anti-clockwise direction mechanically feed the cotton and separate the same from the air by directing the cotton down against the screen beneath the beater and thence out of the exit leading to the gin. The air forcing the dirt and other foreign material through the screen is maintained at substantially even pressure due to the large size of the non-air retarding dust collector.

As the air exhausts to the atmosphere through exhaust duct 36 the air is permitted to circulate freely through the cleaner into the dust collector, whereby the efficiency of the cleaning and conditioning process is greatly increased for the dirt and other foreign matter are forced out of the cleaner chamber under air pressure instead of settling by gravity, as has heretofore been the practice.

While I have illustrated and described a specific apparatus for accomplishing my invention, I wish it understood that I may use various other constructions and embodiments within the scope of the appended claims.

What I claim is:

1. In a cotton cleaning machine having a cleaner chamber with walls thereabout, beater and conveyor rollers disposed in horizontal alignment in said chamber, a screen underlying said chamber, and dust collecting means below said screen; relatively small air and cotton inlet means projecting from one of the walls of said cleaner chamber substantially perpendicular to said screen, a relatively small valveless cotton outlet means projecting from another of said cleaner chamber walls remote from said air and cotton inlet means and substantially at right angles thereto, one of the beater rollers being adjacent to the said outlet means, a relatively large unrestricted air exhaust means cooperating with the said air inlet means through the said screen, and power-driven fan means cooperating with the said air and cotton inlet means, whereby air and cotton are forced through the said relatively small air and cotton inlet means into the said cleaner chamber with substantially all the air passing through the said screen and freely out through the relatively unrestricted air exhaust means.

2. In a cotton cleaning machine having a cleaner chamber with walls thereabout, rotatable heater and conveyor rollers provided with a plurality of radially extending fingers and disposed in horizontal alignment in said chamber, a screen underlying said chamber and dust collecting means below said screen; a relatively small air and cotton inlet tube projecting from one of the walls of said cleaner chamber, said air inlet tube having a depending flange adjacent some of the fingers of one of the said rollers, a relatively small valveless cotton outlet tube projecting from another of said walls remote from said cotton and air inlet tube and substantially at right angle thereto, said cotton outlet tube having an inwardly extending flange adjacent some of the fingers of another of said rollers, a relatively large unrestricted air exhaust tube cooperating with the said air inlet tube through the said screen, and power-driven fan means cooperating with the said air and cotton inlet tube, whereby air and cotton are forced through the relatively small air and cotton inlet tube into the cleaner chamber with substantially all the air passing through the said screen and freely out through the relatively large unrestricted air exhaust tube.

CLYDE J. BAKER.